United States Patent
Onuki

(12)
(10) Patent No.: US 6,428,447 B2
(45) Date of Patent: Aug. 6, 2002

(54) MULTIPLE-GEAR VEHICLE TRANSMISSION

(75) Inventor: Shigemori Onuki, Kawasaki (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/737,156

(22) Filed: Dec. 14, 2000

(30) Foreign Application Priority Data

Dec. 20, 1999 (JP) ............................................ 11-361530

(51) Int. Cl.[7] ................................................ F16H 59/74
(52) U.S. Cl. .......................................... 477/99; 477/908
(58) Field of Search ...................... 477/99, 908; 74/745

(56) References Cited

FOREIGN PATENT DOCUMENTS

| JP | 07266907 A | 10/1995 |
| JP | 08091071 A | 4/1996 |
| JP | 08159258 A | 6/1996 |
| WO | WO94/13981 | 6/1994 |

Primary Examiner—Dirk Wright

(74) Attorney, Agent, or Firm—McCormick, Paulding & Huber LLP

(57) ABSTRACT

A multiple-gear vehicle transmission (3) has a split gear assembly (17) on its input side, a range gear assembly (19) on its output side, and a main gear assembly (18) between them. A drive power of an engine (1) is transmitted to a propeller shaft (5) via the multiple-gear vehicle transmission (3). The split gear assembly (17) has a neutral position (N) in addition to high and low gear positions (H, L). In general, a splitter controller (9, 20) intermittently shifts the split gear assembly (17) between the neutral position (N) and high gear position (H) to intermittently lubricate various parts such as bearings (61A, 61B, 61C) and synchronization mechanisms in a transmission casing (3a). By shifting the split gear assembly (17) into the high gear position, a counter shaft (32) is caused to rotate so that oil is scooped up toward the bearings by the counter shaft (32) and is also supplied to the bearings by an oil pump (35). However, when the engine (1) is started after a considerable period, the controller (9, 20) prohibits the split gear assembly (17) from being shifted into the neutral position (N) in order to continuously lubricate the bearings (61A, 61B, 61C) for a certain period. The intermittent lubrication is conducted after that.

14 Claims, 9 Drawing Sheets

| SPLIT GEAR ASSEMBLY POSITION | ELECTROMAGNETIC VALVE ON | | | POSITION SENSOR ON | | |
|---|---|---|---|---|---|---|
| | H | L | N | H | L | N |
| H | ○ | | | ○ | | |
| L | | ○ | | | ○ | |
| N | ○ | | ○ | | | ○ |

MULTIPLE-GEAR VEHICLE TRANSMISSION

BACKGROUND OF THE INVENTION

1. Field of the Invention

The present invention relates to a multiple-gear transmission applied in a tractor or other vehicle.

2. Description of the Related Art

Because the total vehicle weight of a tractor-trailer that can pull a trailer varies considerably depending on whether the trailer is attached or not, an auxiliary transmission may be mounted to the main transmission for switching between high and low speeds in order to improve drive performance. This type of auxiliary transmission may include a splitter mounted on the input side of the main transmission and a range gear mounted on the output side of the main transmission as disclosed in Japanese Patent Application Laid-Open Publication No. 8-159258.

The conventional splitter has only the two positions of high speed (HIGH) and low speed (LOW), and it must be in one of these two positions at all times.

However, this construction gives rise to the following problem. That is, many long-distance drivers take naps while running the air conditioner. In these circumstances, because the engine drive power is transmitted to a counter shaft of the main transmission via the splitter when the vehicle is parked and the engine is idling, a counter gear mounted to the counter shaft and a main gear mounted to a main shaft in a transmission casing are engaged and rotating at all times, and therefore a rattling noise occurs due to the colliding of the gear teeth. This ratting noise is conveyed to the interior of the vehicle, and heard by the sleeping driver.

To address this problem, such measures as changing the clutch damper characteristics or additionally providing a scissors gear may be possible. However, because the drive power is conveyed to the counter shaft in any event, these are not fundamental solutions. They would also increase the total length of the transmission assembly (main and auxiliary transmissions), which makes mounting of the transmission assembly difficult.

Accordingly, the inventor of the present invention has proposed a solution to the problem described above in Japanese Patent Application No. 11-819915 or corresponding U.S. patent application Ser. No. 09/707,897 filed Nov. 7, 2000, entitled "MULTI-STAGE TRANSMISSION OF VEHICLE" the entire disclosures of which are incorporated herein by reference and referred to as "preceding invention." In this proposed technology, the splitter has a neutral position in addition to high and low gear positions. The drive power transmission is interrupted at the splitter by shifting the splitter to the neutral position. Therefore, if the splitter is brought into the neutral condition, the counter shaft rotation is stopped, and the noise caused by the engaging and rattling of the gears can be eliminated.

In the meantime, a problem of insufficient lubrication may arise when the splitter is left in the neutral position for a long period of time, because oil cannot be circulated or splashed by the counter gear and the oil pump cannot be driven for a long period of time. Various parts in the transmission casing should be lubricated by the oil supplied upon rotation of the counter gear and/or oil pump. In the preceding invention, therefore, the splitter is intermittently shifted between the neutral position and a different position, such that the counter gear is rotated at predetermined intervals, and lubrication is intermittently carried out.

However, the preceding invention entails another problem that when the vehicle is unused for a long period of time for maintenance, etc., oil completely falls off from the shaft support areas (bearings), synchro units, gallery, etc. in the transmission. If the splitter does not have a neutral position, and is locked in either the HIGH or LOW position, the counter shaft begins to rotate upon starting of the engine, thereby initiating lubrication. Therefore, the driver can move the vehicle after a relatively short period of time after the engine is started. However, in the case of the preceding invention, if the splitter is in the neutral position, lubrication does not occur even when the engine is started. As a result, if the driver attempts to move the vehicle in this state, there is no oil circulating among the various transmission components, and the problem of insufficient lubrication occurs.

SUMMARY OF THE INVENTION

An object of the present invention is to provide lubrication to the various transmission components and eliminate the problem of insufficient lubrication in a multiple-gear vehicle transmission equipped with a splitter having a neutral position.

According to one aspect of the present invention, there is provided a multiple-gear vehicle transmission including a main transmission and a splitter that operates as an auxiliary transmission on the input side of the main transmission, wherein the splitter has a neutral position in addition to high and low gear positions, and wherein the multiple-gear transmission has splitter control means that intermittently shifts the splitter between the neutral position and a high (or low) gear position, and splitter neutral shift prohibition means that prohibits the splitter from being shifted to the neutral position when the engine is starting up. By shifting the splitter into the high or low gear position, a counter shaft is caused to rotate and various parts in a transmission casing are lubricated by oil that is splashed up by the counter shaft or delivered by an oil pump attached to the counter shaft. When the splitter is shifted to the neutral position, on the other hand, the counter shaft does not rotate. In a certain period from starting of the engine, sufficient lubrication oil may not penetrate to the parts in the transmission casing. Thus, the counter shaft is caused to rotate to insure sufficient lubrication to these parts. After a while, the splitter is intermittently shifted between the high gear position and neutral so that the lubrication takes place intermittently.

The splitter neutral shift prohibition means may prohibit the splitter from shifting to the neutral position until a prescribed period of time has elapsed after the engine is started.

The splitter neutral shift prohibition means may prohibit the splitter from shifting to the neutral position until a vehicle speed has exceeded a prescribed value after the engine is started.

A range gear that operates as another auxiliary transmission may be provided on the output side of the main transmission.

DETAILED DESCRIPTION OF THE INVENTION

Preferred embodiments of the present invention will be described in detail below with reference to the attached drawings.

Figure 1:
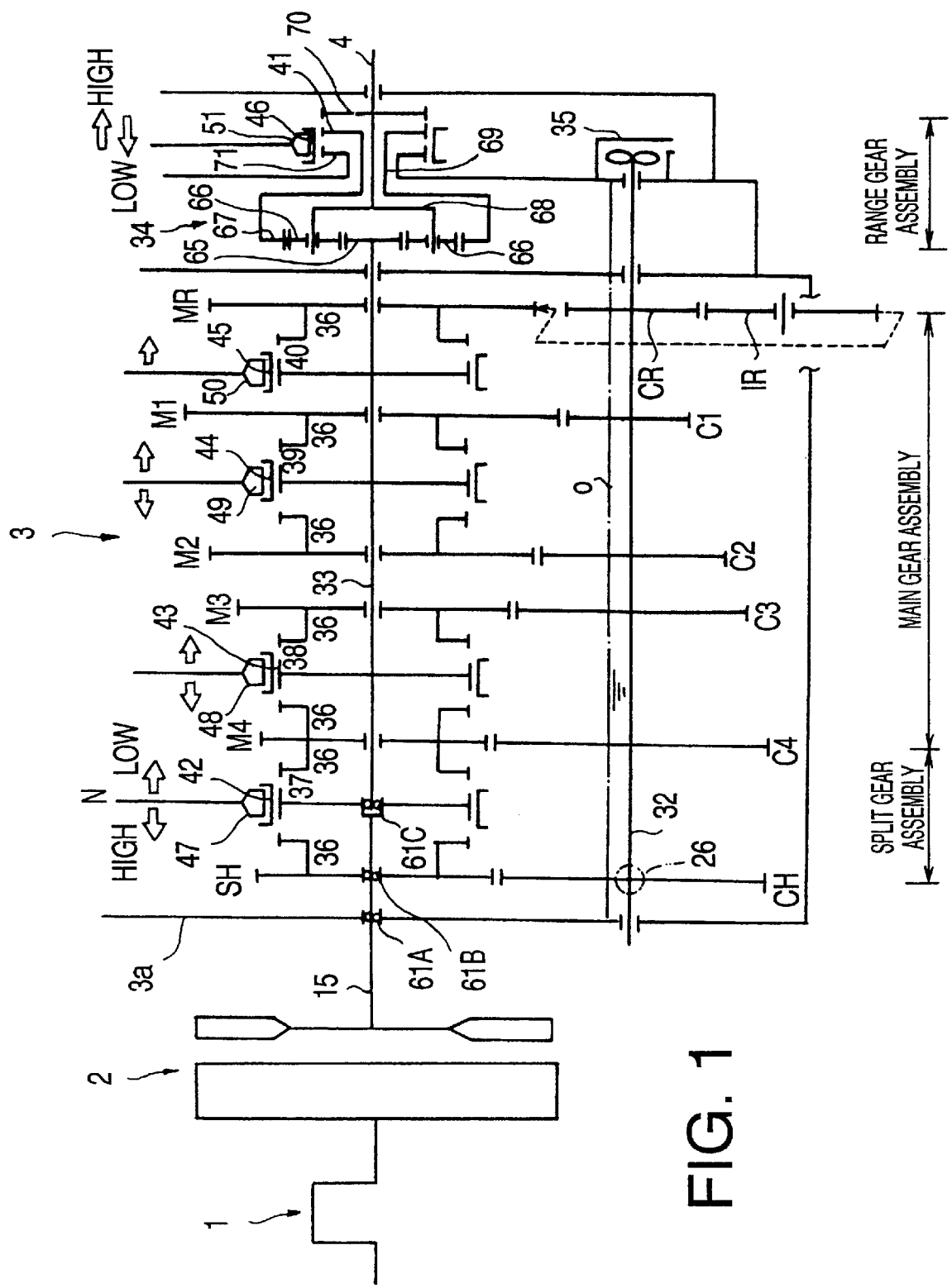
FIG. 1 illustrates a structure diagram of a multiple-gear transmission according to the present invention.
Figure 2:
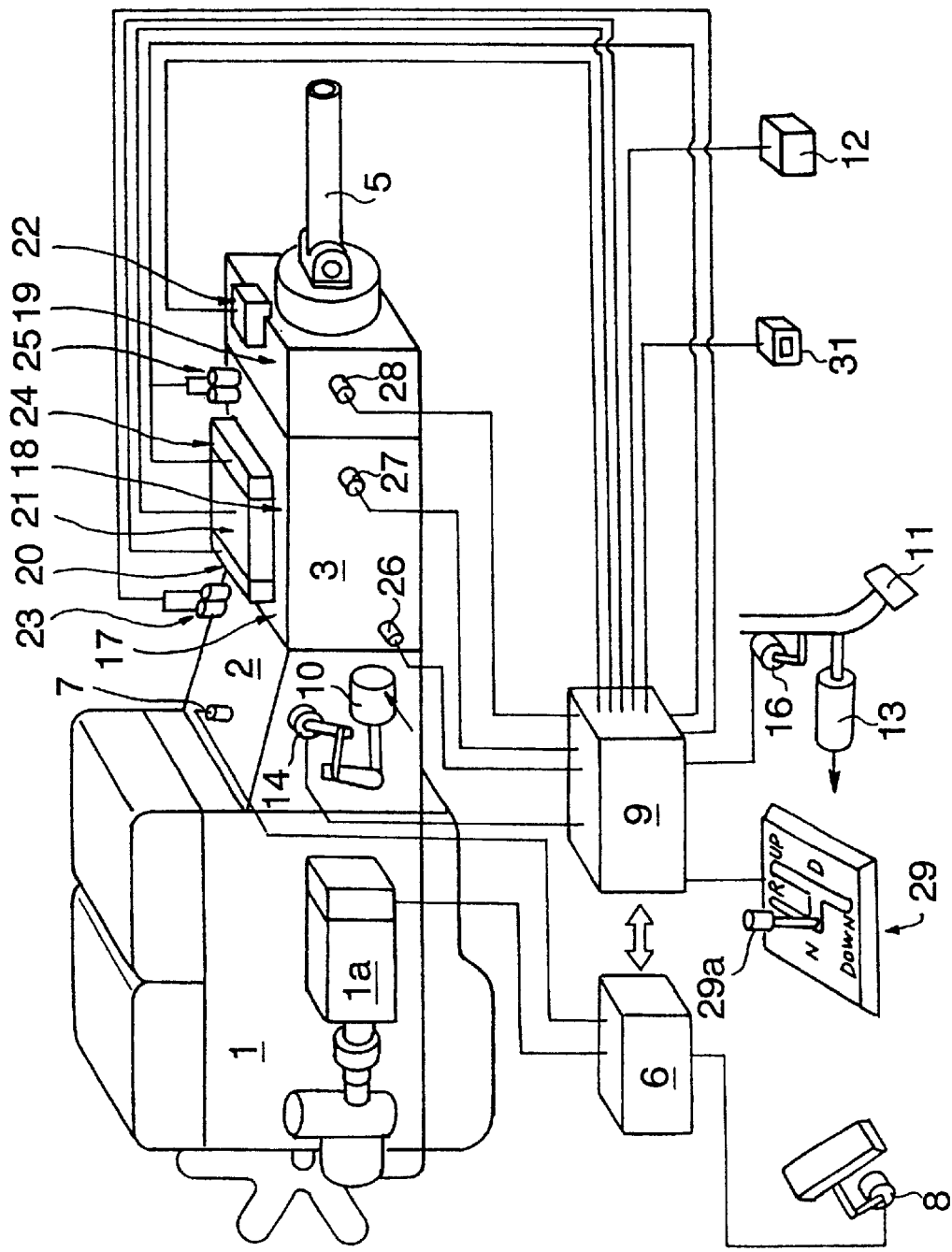
FIG. 2 illustrates the construction of an engine drive system including the multiple-gear transmission shown in FIG. 1.

Referring first to FIG. 2, illustrated is an engine drive system for the vehicle in which the present invention is applied. As shown in the drawing, a multiple-gear transmission 3 is mounted to an engine (diesel engine in this embodiment) 1 via a clutch 2, and the output shaft 4 (see FIG. 1) of the transmission 3 is connected to a propeller shaft 5 to drive a rear axle (not shown in the drawings). The engine 1 is electronically controlled by an engine control unit (ECU) 6. The ECU 6 determines the current engine rotation speed and engine load based on the outputs from an engine revolution speed sensor 7 and an accelerator pedal sensor (sensor for detecting how deep an accelerator pedal is stamped by a driver's foot) 8, and based mainly on these outputs, controls the fuel injection pump 1a, i.e., decides the fuel injection cycle and the injection amount.

The clutch 2 and the transmission 3 may operate automatically based on control signals from a transmission control unit (TMCU) 9. The ECU 6 and the TMCU 9 are connected via a bus cable, etc., and may communicate with each other.

The clutch 2 is a mechanical friction clutch, and is automatically disengaged and engaged by a clutch actuator 10. Manual engagement by a clutch pedal 11 is also possible. Thus, the clutch 2 is a so-called selective automatic clutch. The clutch actuator 10 is operated pneumatically, such that pneumatic pressure is supplied and terminated (released) based on a switching operation of an electromagnetic valve unit 12 operated by the TMCU 9, whereby the clutch 2 is automatically disengaged or engaged. For the manual clutch disengagement and engagement, a hydraulic valve is located inside the clutch actuator 10. Hydraulic force is supplied or terminated from a master cylinder 13 in response to the operation (stamping and releasing) of the clutch pedal 11, whereby the hydraulic valve is opened or closed by this hydraulic force. As the valve is opened and closed, the supply or termination of pneumatic pressure to the clutch actuator 10 is controlled, and the clutch 2 is manually disengaged or engaged. Where the manual clutch engagement/disengagement interferes with the automatic clutch engagement/disengagement, then the manual engagement/disengagement takes priority.

A clutch stroke sensor 14 that detects a clutch stroke (movement of a particular element of the clutch 2) and a clutch pedal stroke sensor 16 that detects the clutch pedal stroke (how deep the clutch pedal 11 is stamped) are also connected to the TMCU 9.

The transmission 3 basically has a constant-mesh construction (or is an "always engaged" type), and includes a split gear assembly 17 on the input side, a range gear assembly 19 on the output side, and a main gear assembly 18 in between these two gear assemblies. The engine power that is conveyed to an input shaft 15 (see FIG. 1) of the transmission 3 is sent to the split gear assembly 17, the main gear assembly 18 and the range gear assembly 19, in that order, and is then output to the output shaft 4. The split gear assembly 17 is an auxiliary transmission on the input side and the splitter of the present invention. The range gear assembly 19 is another auxiliary transmission on the output side and the range gear of the present invention. The main gear assembly 18 serves as the main transmission of the transmission 3.

The transmission 3 has a splitter actuator 20, a main actuator 21 and a range actuator 22 that carry out automatic shifting for the split gear assembly 17, the main gear assembly 18 and the range gear assembly 19, respectively. These actuators are also operated pneumatically in the same way as the clutch actuator 10, and are controlled by the TMCU 9. A split gear position sensor 23, a main gear position sensor 24 and a range gear position sensor 25 that detect the current positions of the gear assemblies 17, 18 and 19, respectively, are connected to the TMCU 9. A main counter shaft rotation speed sensor 26, a main shaft rotation speed sensor 27 and an output shaft rotation speed sensor 28 are also attached to the transmission 3, and are connected to the TMCU 9.

Disengagement/engagement control for the clutch 2 and shifting control for the transmission 3 are performed mainly based on signals from a shift lever unit 29 in the interior of the vehicle. In other words, when the driver shifts the shift lever 29a of the shift lever apparatus 29 to a certain position, a corresponding shift command signal is sent to the TMCU 9, and based on this signal, the TMCU 9 causes the clutch actuator 10, splitter actuator 20, main actuator 21 and range actuator 22 to operate appropriately, and a series of shifting operations are then carried out. The TMCU 9 then displays the current shift position on a monitor 31.

In addition, a parking brake switch and a PTO switch are also electrically connected to the TMCU 9 to always monitor the running condition of the engine 1 and the current status of the vehicle.

FIG. 1 shows the internal construction of the transmission 3. As illustrated, an input shaft 15, a main counter shaft 32 (counter shaft of the transmission), a main shaft 33 and the output shaft 4 are located inside a transmission case 3a. The input shaft 15, main shaft 33 and output shaft 4 extend coaxially, and the main counter shaft 32 extends in parallel to and below the other three shafts.

The front end (where the left side of the drawing is deemed the front) of the input shaft 15 is supported by the transmission case 3a. The frontmost end of the input shaft 15 is connected to the output element of the clutch 2, and the rear end part of the input shaft 15 receives and supports the front end of the main shaft 33. The rear end of the main shaft 33 is supported by the transmission case 3a, and a sun gear 65 (described below) is fixed to the rearmost end of the main shaft 33. The rear end of the output shaft 4 is supported by the transmission case 3a. The main counter shaft 32 is also supported by the transmission case 3a. Transmission oil O is housed inside the transmission case 3a. An oil pump 35 to circulate the transmission oil is attached to the rear end of the main counter shaft 32.

The construction of the split gear assembly 17 and the main gear assembly 18 will now be described. A split high gear SH is rotatably mounted to the input shaft 15. Main gears M4, M3, M2, M1 and MR are rotatably mounted on the main shaft 33 in that order from the front. The gears SH, M4, M3, M2 and M1, but not the gear MR, respectively mesh with counter gears CH, C4, C3, C2 and C1 fixed on the main counter shaft 32 in an always engaged condition. The gear MR is continuously engaged with a reverse idle gear IR, which is continuously engaged with a counter gear CR fixed to the main counter shaft 32.

Splines 36 that enable selection of the gears SH, M4, M3, M2 and M1 mounted to the input shaft 15 and the main shaft 33 are provided in an integrated fashion on each of the above gears. Located in close proximity to the front and rear or to the rear of these splines 36 are first through fourth splines 37 through 40. The first spline 37 is located at the rear end part of the input shaft 15 in an integrated fashion therewith. The second, third and fourth splines 38, 39 and 40 are located in an integrated fashion with the main shaft 33. First through fourth sleeves 42 through 45 are located such that they are engaged with the first through fourth splines 37 through 40 and can slide forward and backward. The first through fourth sleeves 42 through 45 engage with and separate from the nearby splines 36 of the gears by their sliding movement, as indicated by the arrows in FIG. 1, so as to link together or separate the first through fourth splines 37 through 40 and the gear splines 36.

First through fourth shift arms 47 through 50 are located such that they engage with the first through fourth sleeves 42 through 45. The first shift arm 47 is connected to the splitter actuator 20, and the second through fourth shift arms 48 through 50 are connected to the main actuator 21.

As described above, the split gear assembly 17 and the main gear assembly 18 have a constant-mesh construction in which they may be automatically shifted by the actuators 20 and 21, and the desired gear may be selected by each actuator appropriately moving the first through fourth sleeve 42 through 45 and linking the splines. A synchromesh mechanism not shown in the drawing exists in between each spline unit, such that linking may occur in a synchronous fashion. A neutral position by which the transmission 3 is placed in neutral is defined in the spline unit of the main gear assembly 18 that includes the second through fourth splines 38 through 40.

The area to the main gear M4 and the counter gear C4, inclusive, comprises the split gear assembly 17, and the area between the main gear M4 and the counter gear C4 on the one hand, and the main gear MR, the counter gear CR and the reverse idle gear IR on the other hand, comprises the main gear assembly 18.

The construction of the range gear assembly 19 will now be described. The range gear assembly 19 employs a planetary gear train 34, and is switched only between the positions of HIGH and LOW. The planetary gear train 34 includes a sun gear 65 fixed to the rearmost end of the main shaft 33, a plurality of planetary gears 66 that engage with the sun gear 65 around its circumference, and a ring gear 67 on the inner circumference of which are formed teeth that engage with the outer circumference of each planetary gear 66. The planetary gears 66 are rotatably supported by a common carrier 68, which is linked to the output shaft 4. The ring gear 67 is integrally formed with a hollow cylinder 69, which is placed around the output shaft 4 such that it can rotate relative to the output shaft 4, thereby defining a double shaft structure together with the output shaft 4.

The fifth spline 41 is integrally formed with the cylinder 69. In addition, an output shaft spline 70 is integrally formed with the output shaft 4 such that it is adjacent to the rear part of the fifth spline 41. A fixed spline 71 is mounted to the transmission case 3a such that it is adjacent to the front part of the fifth spline 41. A fifth sleeve 46 that engages with the fifth spline 41 is mounted such that it can slide forward and backward.

When the fifth sleeve 46 slides forward as indicated by the arrow, it also engages with the fixed spline 71, linking the fifth spline 41 and the fixed spline 71. The ring gear 67 becomes fixed to the transmission case 3a by this link, so that the output shaft 4 is driven to rotate at a reduction gear ratio larger than 1. This is the LOW position.

On the other hand, when the fifth sleeve 46 slides backward as indicated by the arrow, it also engages with the output shaft spline 70, linking the fifth spline 41 and the output shaft spline 70. The ring gear 67 and the carrier 68 become fixed to each other by this link, so that the output shaft 4 is directly driven to rotate at a reduction gear ratio of 1. This is the HIGH position.

A fifth shift arm 51 is mounted such that it engages with the fifth sleeve 46, and is connected to the range actuator 22. In this way, the range gear assembly 19 is automatically shifted between HIGH and LOW by the range actuator 22. As described above, a synchromesh mechanism (not shown) is mounted between each spline unit of the range gear assembly 19, thereby enabling linking to be performed in a synchronous fashion. The area from the planetary gear train 34, inclusive, comprises the range gear assembly 19.

Figure 8:
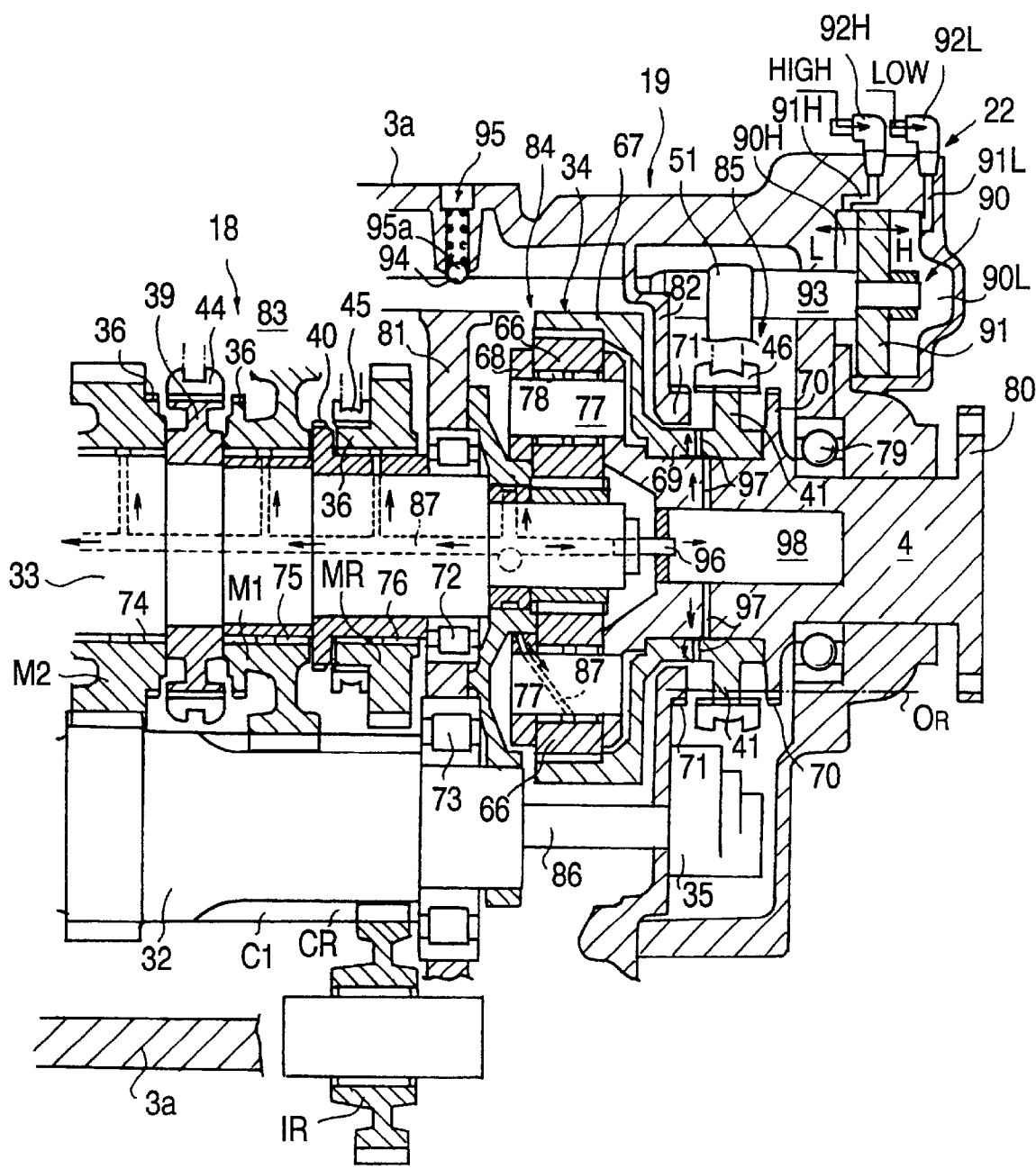
FIG. 8 is an enlarged vertical cross-section showing a range gear assembly and associated parts.

Referring to FIG. 8, illustrated is a detail of the range gear assembly 19 and neighboring parts in enlarged scale. The main shaft 33 and the main counter shaft 32 are supported by the transmission case 3a with bearings 72 and 73. Roller bearings 74 through 76 support the main gears M2, M1 and MR.

A plurality of shafts 77 pass through and are supported by the carrier 68, and the planetary gears 66 are mounted to the outer circumference of these shafts 77 via roller bearings 78. The hollow cylinder 69 of the ring gear 67 is placed around the output shaft 4 such that it can rotate relative to the output shaft 4, thereby forming the double shaft structure. The output shaft 4 is supported by the transmission case 3a via a bearing 79. A flange 80 that links to the propeller shaft 5 is located at the rear end of the output shaft 4 (See FIG. 2).

The transmission case 3a is divided into three areas by two partition walls 81 and 82. In other words, these areas are a main gear compartment 83, a planetary gear compartment 84 and a range spline compartment 85. A pump shaft 86 mounted to the rear end of the main counter shaft 32 traverses the planetary gear compartment 84 and connects to the oil pump 35 located in the range spline compartment 85. The main gear compartment 83 and the planetary gear compartment 84 are communicated with each other, but the range spline compartment 85 is separate and independent from the other two compartments. The oil level inside the range spline compartment 85 is indicated by $O_R$. This level is exactly the level that covers the fifth spline 41, the output shaft spline 70 and the fixed spline 71. In between these splines are located synchromesh mechanisms not shown in the drawing, in the same manner as described above.

An oil channel 87 extends inside the main shaft 33 and the carrier 68 such that oil is supplied to the roller bearings 74 through 76, 78, etc. Oil expelled from the oil pump 35 is supplied through this oil channel 87. Inside the output shaft 4 is also formed a closed-off oil channel 98, which receives the oil from the oil channel 87 of the main shaft 33 via a connecting tube 96. The oil from this oil channel 98 is supplied to the moving parts between the hollow cylinder 69 and the output shaft 4, the spline units and the synchromesh units via small oil channels 97 that extend in a radial fashion. The direction of oil supply is indicated by arrows.

Referring back to FIG. 1, in this transmission 3, when the first sleeve 42 is shifted forward or backward by the first shift arm 47 in the split gear assembly 17, HIGH or LOW position is obtained. Accordingly, eight forward gears are selectable for each of these HIGH and LOW positions (for a total of 16 gears), and one reverse gear is selectable. The main gear M4 and the counter gear C4 serve as the LOW gear of the split gear assembly 17 and as the seventh and eighth speed gears of the main gear assembly 18.

When the first sleeve 42 is moved to the intermediate position in the split gear assembly 17 by the first shift arm 47, a neutral (N) position is obtained. In the neutral position, the first sleeve 42 is positioned on the spline 37 only; it does not engage with either of the adjacent splines 36 located in front and in back of it. In the conventional arrangement, there is no such neutral position, and either the HIGH or LOW position must be selected.

The existence of this neutral position allows the occurrence of the rattling noise described above to be eliminated. When the vehicle is parked and idling, the clutch 2 is engaged and the main gear assembly 18 is in neutral. If the split gear assembly 17 is shifted to the HIGH position in this state, the engine power is transmitted to the main counter shaft 32 along the following route: the input shaft 15, the first spline 37, the first sleeve 42, the spline 36 of the split high gear SH, the split high gear SH, and the counter gear CH. When this occurs, the counter gears C4, C3, C2, C1 and CR fixed on the main counter shaft 32, the main gears M4, M3, M2, M1 and MR mounted to the main shaft 33, and the reverse idle gear IR engage and rotate, resulting in a rattling noise caused by the colliding of the gears.

If the split gear assembly 17 is shifted to the LOW position, the engine power is transmitted to the main counter shaft 32 along the following route: the input shaft 15, the first spline 37, the first sleeve 42, the spline 36 of the main gear M4, the main gear M4, and the counter gear C4. Consequently, the gears in the above gear group engage and rotate, resulting in the rattling noise.

On the other hand, if the split gear assembly 17 is shifted to the neutral (N) position, the engine power is cut off at the input shaft 15 so that only the input shaft 15, the first spline 37 and the first sleeve 42 rotate, and the rotation of the gear group described above is prevented. In this way, the rattling noise caused by the colliding of the gears is eliminated.

Figures 3, 4:
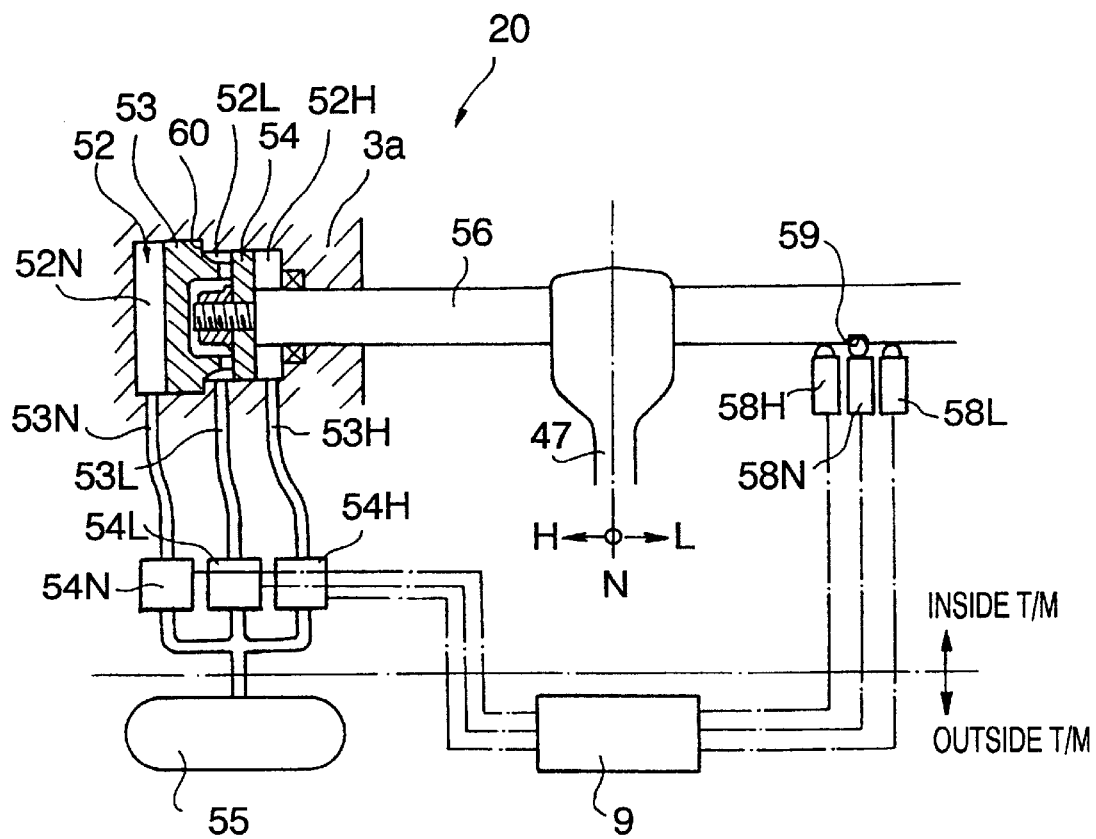
FIG. 3 illustrates the construction of a splitter actuator used in the engine drive system shown in FIG. 2.
FIG. 4 illustrates an operation matrix of the splitter actuator.

Referring to FIG. 3, illustrated is a construction of the splitter actuator 20 that enables this neutral operation. A cylinder compartment 52 is formed inside the transmission case 3a, this cylinder compartment 52 houses a first piston 53 and a second piston 54, and in this way the cylindrical compartment 52 is divided into three sub-compartments 52N, 52L and 52H. These cylindrical compartments 52N, 52L and 52H have respective pneumatic paths 53N, 53L and 53H, which also extend inside the transmission case 3a. These ports 53N, 53L and 53H have electromagnetic valves 54N, 54L and 54H, and extend to an air tank 55 respectively. A striking rod 56 is connected to the second piston 54 such that it can slide forward and backward (where the left side of the drawing is deemed the front), and the first shift arm 47 that engages with the first sleeve 42 is fixed to the striking rod 56.

In this way, the first shift arm 47 is moved backward and forward in three stages by the first piston 53 and the second piston 54, enabling the first sleeve 42 to be moved to each of the positions of neutral (N), HIGH (H) and LOW (L).

Position sensors 58N, 58L and 58H that include detent ball switches for detecting the HIGH, LOW and N positions, respectively, are associated with the striking rods 56. The split gear position sensor 23 is constituted by these position sensors. A single detent groove 59 is formed on the striking rod 56. Only the position sensor of which detent ball is trapped in the recess 59 becomes ON, thereby allowing the detection of each position. The electromagnetic valves 54N, 54L and 54H, and the position sensors 58N, 58L and 58H are electrically connected to the TMCU 9.

The relationships among the electromagnetic valves 54N, 54L and 54H, the position sensors 58N, 58L and 58H, and the split gear assembly positions are as shown in FIG. 4. When the HIGH position is selected, for example, only the electromagnetic valve 54H is turned on, and the remaining valves 54L and 54N are turned off. Because pneumatic pressure is supplied from the air tank 55 through the electromagnetic valve that is ON, and pneumatic pressure supply is stopped by the other electromagnetic valves that are OFF (the cylinder compartments are opened to the air through the electromagnetic valves that are OFF), the pneumatic pressure is supplied to only the cylindrical compartment 52H. As a result, the two pistons 53 and 54 are simultaneously moved toward the frontmost end, and the split gear assembly 17 is shifted to HIGH. If the LOW position is selected, only the electromagnetic valve 54L becomes ON, and the first piston 53 is moved to the frontmost end, while the second piston 54 moves away to the rearmost end. Consequently, the split gear assembly 17 is shifted to LOW.

When the neutral position is selected, the electromagnetic valves 54H and 54N are simultaneously turned ON, and the electromagnetic valve 54L is turned OFF. If this occurs, the first piston 53 and the second piston 54 move closer together. The first piston 53 strikes a piston stopper surface 60 and stops, and the second piston 54 strikes the first piston 53 and stops. Thus, both pistons end up positioned approximately in the center of the cylindrical compartment 52 so that the split gear assembly 17 takes the neutral position.

A similar construction is used in the actuator 22. As shown in FIG. 8, a cylinder compartment 90 is formed in the rear part of the interior of the transmission case 3a, a range piston 91 is housed in the cylinder compartment 90 such that it may move forward and backward, and the cylinder compartment 90 is divided into two sub-compartments 90L and 90H. The sub-compartments 90L and 90H have respective pneumatic ports 91L and 91H that are formed inside the transmission case 3a, and inlet nipples 92L and 92H are respectively mounted to the ports. These inlet nipples are respectively connected to an air tank via electromagnetic valves not shown in the drawing.

A range striking rod 93 is connected to the range piston 91 such that it can slide forward and backward, and a fifth shift arm 51 that engages with the fifth sleeve 46 is fixed to the range striking rod 93. A detent groove 94 is formed on the range striking rod 93, and a position sensor (detent ball switch) 95 is provided nearby. This position sensor 95 serves as the range gear position sensor 25. As the position sensor 95 is turned ON and OFF, the HIGH or LOW position of the range gear assembly is detected, through the engagement or separation of the detent ball 95a with the detent groove 94.

When pneumatic pressure is supplied to the rear cylindrical compartment 90L, the range striking rod 93 moves to the front and the range gear assembly 19 enters the LOW position, while when pneumatic pressure is supplied to the front cylindrical compartment 90H, the range striking rod 93 moves to the back and the range gear assembly enters the HIGH position.

Incidentally, when the vehicle is parked and idling and the split gear assembly 17 is maintained in the neutral position for a long period of time, the following problem occurs. With reference to FIG. 1, bearings are placed in all the shaft support areas in the transmission case 3, and these shaft support areas are lubricated either by the oil splashed by the counter gears C4, etc., or by the oil supplied from the oil pump 35.

However, because the main counter shaft 32 is not driven to rotate when the split gear assembly 17 is shifted into neutral, the oil splashing and the driving of the oil pump 35 do not take place.

When the split gear assembly 17 is in neutral while the vehicle is parked and idling, the only component that rotates as a practical matter is the input shaft 15. As a result, there is no problem of inadequate lubrication of the shaft support areas for the other shafts, but at least there is a risk of inadequate lubrication of the shaft support area for the input shaft 15. Specifically, there is a risk that the three bearings 61A, 61B and 61C shown in the drawing will suffer friction wear due to lack of lubrication, or in the worst case scenario, will become fused together.

Accordingly, the split gear assembly 17 is intermittently shifted between the neutral position and a different position, such that the main counter shaft 32 is caused to rotate, and lubrication of the shaft support area is intermittently performed.

Figure 6:
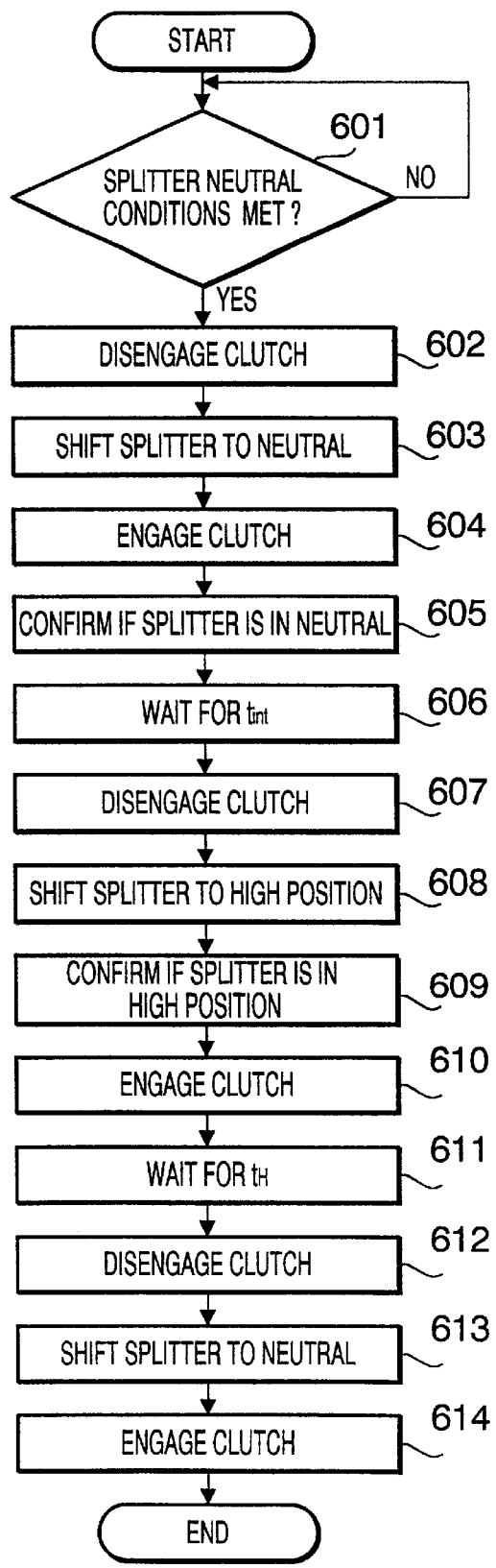
FIG. 6 is a flowchart showing the basic control process for the splitter.

This intermittent lubrication will now be described in reference to FIG. 6 that shows the basic control of this intermittent shifting operation. The control is performed by the TMCU 9. Here, it will be assumed that the driver is taking a nap while the vehicle is parked and idling and the air conditioner is running.

The TMCU 9 first determines in step 601 whether or not the conditions (splitter N conditions) for shifting the split gear assembly 17 into neutral (N) exist. These conditions are that the main gear assembly is in neutral, the vehicle speed is near zero, the parking brake is engaged, and the PTO switch is OFF, and all of these conditions must be in effect for a prescribed minimum period of time (for example, three seconds). When the conditions are met, the TMCU 9 advances to step 602, and if the conditions are not met, the TMCU 9 repeats step 601.

In step 602, the clutch 2 is automatically disengaged, and in the subsequent step 603, the splitter actuator 20 is operated and the splitter gear assembly 17 is shifted into neutral. The TMCU 9 then advances to step 604, and the clutch 2 is automatically engaged. In step 605, the position sensor 58N checks whether the splitter gear assembly 17 is in neutral. When this check is completed, the TMCU 9 advances to step 606, in which a built-in timer counts the time and waits for a prescribed interval $t_{int}$ to elapse. This interval $t_{int}$ is determined based on oil temperature in accordance with a method described below.

When this interval elapses, the clutch 2 is automatically disengaged in step 607, the split gear assembly 17 is shifted to HIGH (H) in step 608, the position sensor 58H checks in step 609 whether the shifting to HIGH has been completed, and the clutch 2 is automatically engaged in step 610. As a result, the main counter shaft 32 begins rotating, and lubrication is provided to the shaft support areas.

The TMCU 9 then advances to step 611, in which the built-in timer counts the time and waits for a prescribed period $t_H$ to elapse. This period is determined in accordance with a method to be described below. When the period elapses, the TMCU 9 advances to step 612 in which the clutch 2 is automatically disengaged, the split gear assembly 17 is shifted into neutral in step 613, and the clutch 2 is automatically engaged in step 614. With this, the control process ends. If this sequence is repeated, the split gear assembly neutral shifting process and the lubrication process are repeatedly performed any number of times.

The methods to determine the interval $t_{int}$ in step 606 and the lubrication cycle interval $t_H$ in step 611 (the period over which the split gear assembly 17 is shifted into HIGH) will now be described.

As described above, in the basic control process, the split gear assembly 17 is shifted into HIGH each time a prescribed time interval elapses, such that the counter shaft 32 is rotated for a fixed amount of time, and lubrication is thereby provided. The relationship between the interval that triggers a shift into HIGH, and the period used for a single lubrication cycle are important from the standpoint of balancing the lubrication performance and the noise reduction performance. In this particular embodiment, whether or not the lubrication is required is determined from the oil's temperature, i.e., its viscosity, and the time periods described above are determined accordingly.

The basic principle for this determination will be described below: if the oil is hot and its viscosity is low, the shaft support areas will easily lose their oil. Therefore, lubrication is performed at relatively short intervals. At the same time, because the hot oil easily permeates into the moving parts, the period for one lubrication cycle is set to be short. If the oil temperature is low and the viscosity is high, on the other hand, the shaft support areas do not easily lose their oil, and therefore the lubrication interval is set to be long. At the same time, because the cold oil does not easily circulate among the moving parts, the period for one lubrication cycle is set to be long. If the oil temperature is extremely low and the viscosity is extremely high, the interval is set to zero such that the split gear assembly 17 is maintained at HIGH, the main counter shaft 32 is kept rotated, the oil is actively churned, and lubrication is continuously performed in order to heat up the oil rapidly and attain the desired lubrication performance quickly. When this occurs, a large degree of viscosity resistance occurs between the gears so that very little noise is caused by the colliding of the gear teeth, and the rattling noise problem does not occur.

Testing with an actual machine is performed based on this principle to find out when lubrication is no longer maintained, and then the HIGH shift trigger interval and lubrication cycle period are determined while factoring in a safety margin.

However, if the oil temperature were directly used as a parameter, a separate oil temperature sensor would be required. In this particular embodiment, accordingly, the oil temperature is estimated based on the decrease in the rate of rotation of the main counter shaft 32 as measured by the main counter shaft rotation speed sensor 26 shown in FIG. 1 and FIG. 2, and the HIGH shift trigger interval and the lubrication cycle period are determined based thereon. The main counter shaft rotation speed sensor 26 obtains rotational pulses from the counter gear CH and is originally provided for the shifting control, but here it is also used to estimate the oil temperature. Use of the single sensor 26 for two purposes reduces the manufacturing cost of the apparatus.

Figure 5:
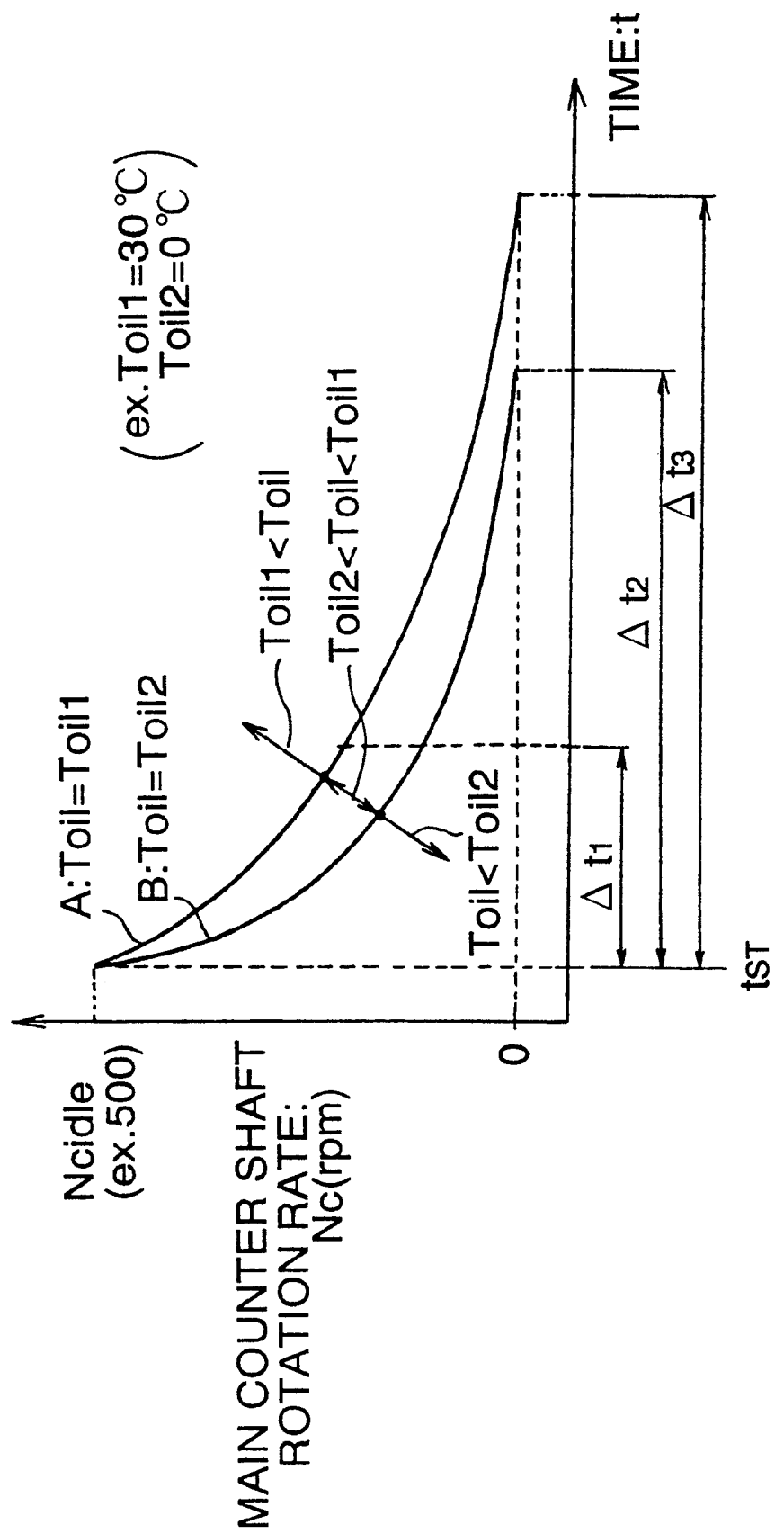
FIG. 5 is an oil temperature estimation map.

An oil temperature estimation map used during the oil temperature estimation process is shown in FIG. 5. In this map, the horizontal axis represents time t, while the vertical axis represents the rate of rotation Nc of the main counter shaft (in rpm). The two curved lines A and B represent the decline in the main counter shaft rotation rate Nc when the oil temperature Toil equals Toil1 and Toil2, respectively. Toil1 is greater than Toil2, and Toil1 is set to 30° C. and Toil2 is set to 0° C. in this embodiment. The decrease in the rate of rotation begins from the main counter shaft rotation rate Ncidle that occurs when the engine is idling, and ends when the rate of rotation becomes zero. Here, Ncidle is 500 rpm. The point at which the rotation rate begins to decrease is the point at which the clutch is completely disengaged. This starting point is indicated by $t_{sr}$.

As shown in the drawing, the decline in the rate of rotation when the oil temperature is LOW (Toil2) is more severe than when the oil temperature is HIGH (Toil1), and the time until zero rotation is shorter ($\Delta t_2 < \Delta t_3$). In the area under the curved line B Toil<Toil2, in the area sandwiched between the curved lines A and B Toil2<Toil<Toil1, while in the area above the curved line A Toil1<Toil.

There are two methods by which to estimate the oil temperature from the decline in the actual rotation speed. In one method, the decline in the rotation speed over a fixed time ($\Delta t_1$) beginning from the starting point is detected and compared to the map, while in the other, the elapsed time from the starting point to the ending point is measured, and this period is compared with the time $\Delta t_2$ or $\Delta t_3$ in the map. In the illustrated embodiment, the former method is adopted because the results may be obtained using a short measuring time, but the latter method may be chosen instead. The oil temperature estimation map is stored beforehand in the TMCU 9.

Figure 7:
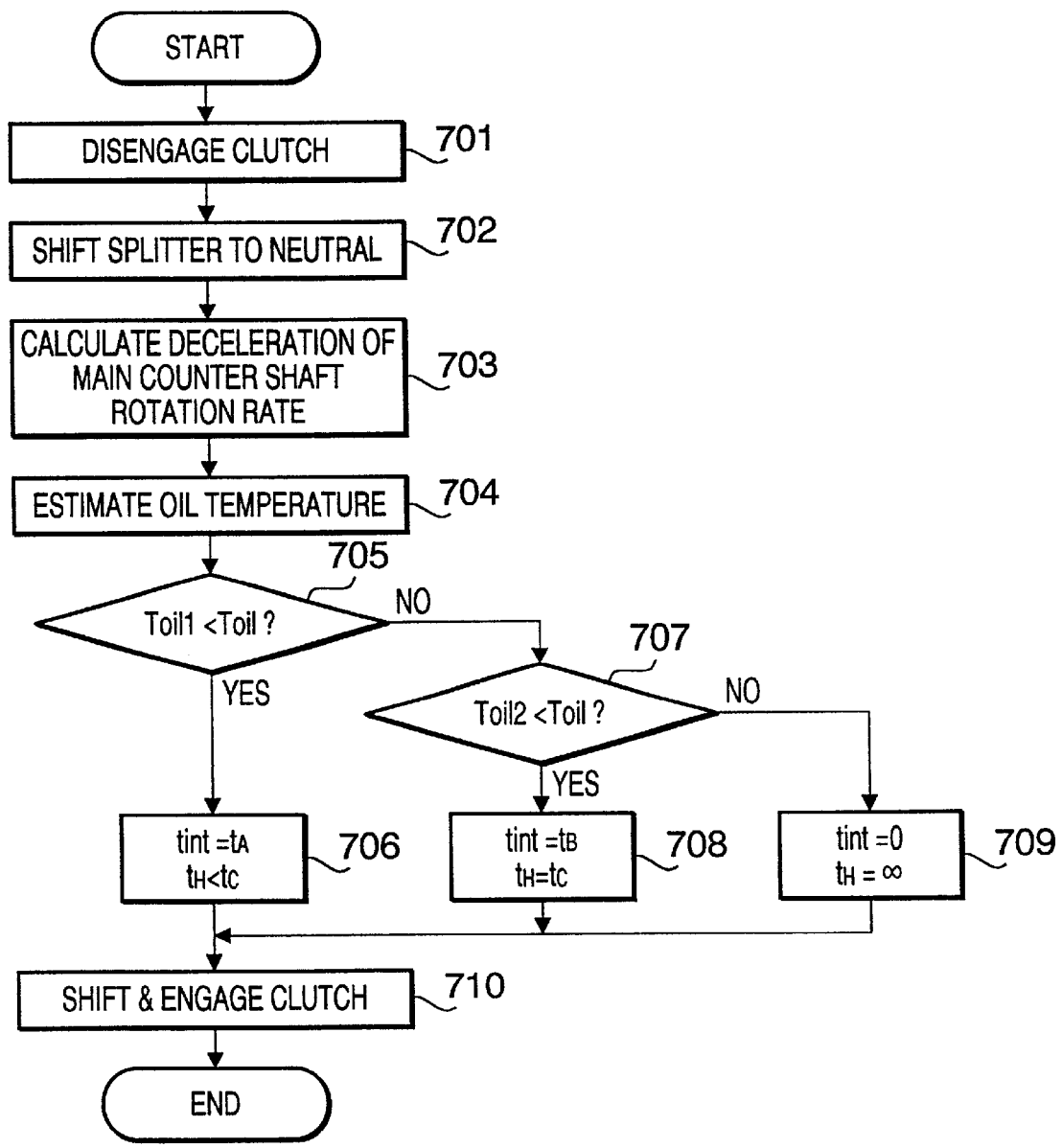
FIG. 7 is a flowchart showing the process to determine the HIGH shift trigger interval, etc.

An example of process for determining the HIGH shift trigger interval and the lubrication cycle period is shown in FIG. 7. This process is executed by the TMCU 9. Here, the determination of the trigger interval and lubrication period is performed concurrently with the clutch control carried out when the vehicle begins to move.

First, it is required, as preconditions for vehicle movement, that the shift lever be in neutral (i.e., that the main gear assembly be in neutral), that the clutch be engaged, and that the engine be idling. When the driver shifts the shift lever into a drive position from this state, the clutch is automatically disengaged in order to put the transmission into gear. When this occurs, the split gear assembly is shifted into neutral in order to estimate the oil temperature and determine the HIGH shift trigger interval and lubrication cycle period.

The process shown in the drawing is begun at the same time that the driver operates the shift lever. First, in step 701, the clutch is automatically disengaged, and in step 702 the split gear assembly (splitter) is simultaneously shifted into neutral (N). When this occurs, the main counter shaft rotation rate begins to decrease from Ncidle. Therefore, in step 703, this deceleration in the rate of rotation is calculated, and in step 704, the oil temperature Toil is estimated.

The TMCU 9 then advances to step 705, in which the estimated oil temperature Toil is compared with the previously set oil temperature Toil1. If Toil1<Toil, the TMCU 9 advances to step 706, and the HIGH shift trigger interval $t_{int}$ is set to $t_A$ (here, approximately two hours), and the time $t_H$ for a single lubrication cycle is set to a time shorter than time $t_C$ (which here is approximately five minutes). If Toil1≧Toil, the TMCU 9 advances to step 707, and the oil temperature Toil is compared with the set oil temperature Toil2. If Toil2<Toil, the TMCU 9 advances to step 708, in which the HIGH shift trigger interval $t_{int}$ is set to $t_B$ ($t_B > t_A$, and here it is approximately four hours), and the period $t_H$ for one lubrication cycle is set equal to time $t_C$. If Toil2≧Toil, the TMCU 9 advances to step 709, in which the HIGH shift trigger interval $t_{int}$ is set to 0, such that the main counter shaft is continuously rotated until the oil temperature Toil reaches Toil2, and lubrication is continuously performed.

Once the HIGH shift trigger interval $t_{int}$ and the lubrication cycle period $t_H$ are determined in this fashion, the TMCU 9 advances to step 710, in which main gear assembly shift control and clutch engagement control are performed, and the control process comes to an end.

As described above, this control process allows the longest possible HIGH shift trigger interval and the minimum lubrication cycle period to be obtained based on the actual oil temperature, the lubrication performance and the noise reduction performance may be balanced to the optimal extent, and at the same time high reliability may be maintained.

Variations of the present invention are also possible. For example, as shown in steps 607 and 610 in FIG. 6, in the current embodiment, when the split gear assembly is shifted, the clutch is disengaged and then reengaged when shifting is completed for purposes of mechanical protection, but this clutch disengagement and reengagement may be omitted since the synchromesh mechanisms allow shifting to be performed without disengaging and engaging the clutch if the main gear assembly is in neutral and the engine is idling. In addition, in the current embodiment, the split gear assembly is shifted into HIGH when lubrication is performed, because the main counter shaft rotation rate is higher and lubrication may be efficiently performed. However, the split gear assembly may be shifted into LOW instead, although the lubrication performance will be reduced to some extent as a result. In short, the split gear assembly should be shifted into any position other than neutral. The specific values for each variable value (Toil1, Toil2, etc.) may also be changed in accordance with given conditions. In the current embodiment, the HIGH shift trigger interval and lubrication cycle period are both determined based on the oil temperature, but it is acceptable if only one of them is determined. In this case, because there is a narrow range of fluctuation in the lubrication time, only the HIGH shift trigger interval may be varied in accordance with the oil temperature.

As may be understood from the foregoing description, the splitter actuator 20 and the TMCU 9 constitute in combination the splitter control of the present invention.

As described above, when the engine is started after a long layoff for a purpose such as maintenance, and the engine is warmed up with the splitter in neutral before the vehicle begins moving, the vehicle moves without the oil having circulated in the bearing areas, synchromesh units, etc., giving rise to the risk of lubrication failure.

In other words, as shown in FIG. 1 and FIG. 8, because the main counter shaft 32 does not rotate when the split gear assembly 17 is in neutral, the churning of the oil by the counter gears CH, C4, etc. cannot occur. Furthermore, because the oil pump 35 also is not being driven, oil cannot be supplied to the various bearing areas via the oil channel 87, etc.

In particular, because a counter gear does not exist in the range gear assembly 19, scooping up of the oil by the counter gear cannot be expected. As a result, oil must be supplied by the oil pump, which is disadvantageous in terms of oil supply. In the range spline compartment 85, oil is supplied to the spline units and the synchromesh units via the supply of oil from the oil pump 35 and the scooping action caused by the rotations of the fifth spline 41 and output shaft spline 70, but because there is no supply from the oil pump 35 when the split gear assembly 17 is in neutral and the range gear assembly 19 is not driven at all, there can be no scooping of oil by the spline. Consequently, the vehicle begins moving while there is not sufficient oil circulating in the spline units and the synchromesh units, and the problem of inadequate lubrication occurs to a significant extent. At the same time, because the oil level $O_R$ is set to just cover the fifth spline 41 and the output shaft spline 70, inherently only a small amount of oil can be scooped up, so it is preferred that sufficient lubrication be provided via the oil pump 35 before the vehicle is driven. This is even more true at low temperatures, in which situation the oil does not circulate easily.

Accordingly, in order to eliminate the problem described above, this transmission 3 has splitter neutral shift prohibition means that prohibits the splitter gear assembly 17 from being shifted into neutral when the engine has just started. Specifically, this means comprises a shift prohibiting program stored beforehand in the TMCU 9. The contents of this program will be described below.

Figure 9:
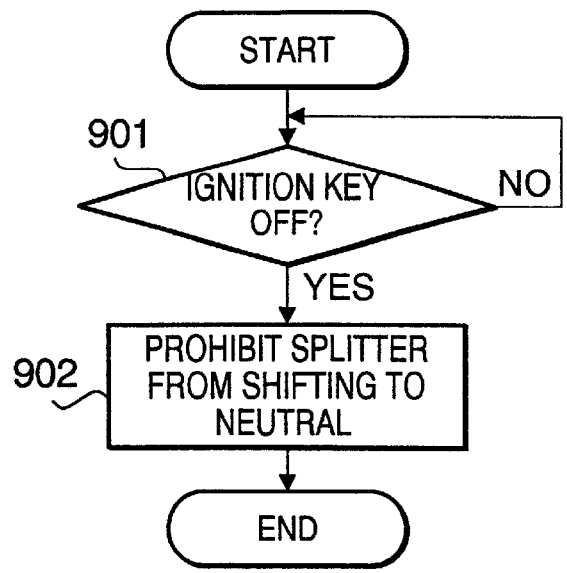
FIG. 9 is a flowchart showing the process for prohibiting the splitter from shifting to a neutral position.

FIG. 9 shows the contents of the control performed when the engine is stopped, i.e., the splitter N-prohibition control. First, the TMCU 9 determines in step 901 whether or not a vehicle ignition key is in the OFF position, i.e., whether an engine stop instruction has been issued. If the vehicle ignition key is not in the OFF position, the TMCU 9 returns to step 901 and waits for it to be moved to the OFF position, while if it is in the OFF position, the TMCU 9 advances to step 902 and prohibits the execution of control to shift the split gear assembly 17 (splitter) into neutral (N). When this occurs, if the split gear assembly 17 is already in neutral, the TMCU 9 shifts it into either HIGH or LOW, while if the split gear assembly 17 is in HIGH or LOW, the TMCU 9 maintains that state. The TMCU 9 then ends control, at which point the ECU 6 stops the engine. As a result, the engine or the vehicle is stopped with the split gear assembly 17 in either HIGH or LOW.

Figure 10:
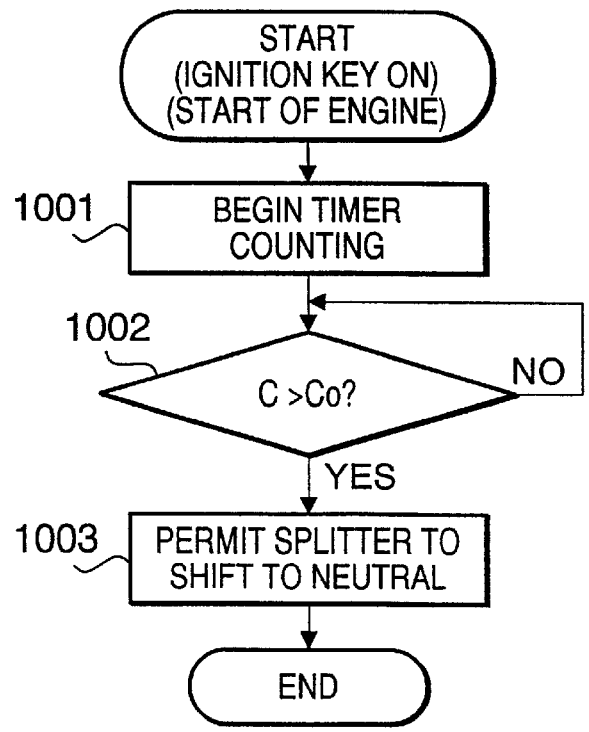
FIG. 10 is a flowchart showing the process for maintaining the splitter neutral shift prohibition control.

FIG. 10 shows the control process executed when the engine is started after the control process described above is completed, i.e., splitter N-prohibition maintenance control. This control process is begun when the ignition key is turned ON, i.e., as a practical matter, when the engine is started. First, in step 1001 the TMCU 9 begins counting using a built-in timer. The TMCU 9 then advances to step 1002, in which it compares the counter value C with a preset value $C_0$. This set value $C_0$ is defined as the amount of time sufficient to allow oil to be distributed among all of the various units in the transmission that require lubrication, and is determined experimentally. Here, it is ten minutes. If the counter value C is equal to or less than the set value $C_0$, step 1002 is repeated, while if the counter value C is larger than the $C_0$, the TMCU 9 advances to step 1003, in which the control to allow the split gear assembly 17 to be shifted into neutral is permitted. With this, the control process ends and normal control shown in FIG. 6 is carried out. As described above, by this control process, the splitter is prohibited from being shifted into neutral position until the prescribed time $C_0$ has elapsed after the engine is started. Through this control, the counter shaft and the oil pump are rotated for at least the period $C_0$, and sufficient lubrication is provided inside the transmission.

Figure 11:
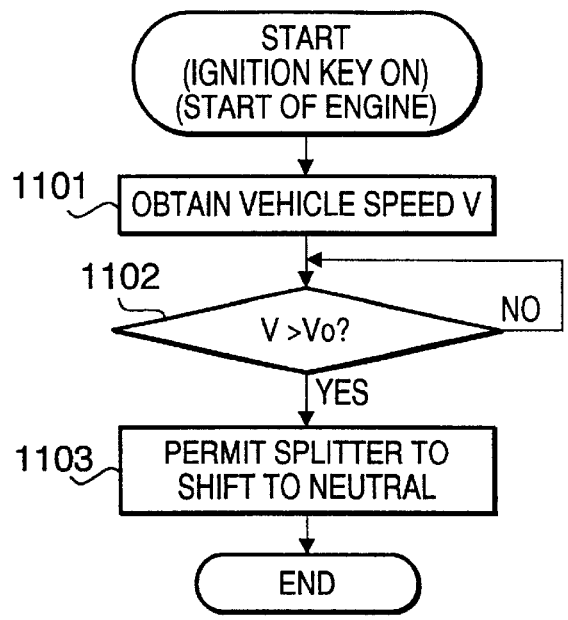
FIG. 11 is a flowchart showing an alternative process for maintaining the splitter neutral shift prohibition control.

FIG. 11 shows a variation of the splitter N-prohibition maintenance control. In this variation, the splitter is kept prohibited from being shifted into neutral until the vehicle speed exceeds a prescribed value after the engine is started. In other words, in step 1101 the TMCU 9 calculates the vehicle speed V based on the output from the output shaft rotation rate sensor 28, and in step 1102 the TMCU 9 compares the vehicle speed V with a preset value $V_0$. In the same manner as described above, this set value $V_0$ is defined as the vehicle speed sufficient to ensure that adequate lubrication is provided to the various units inside the transmission requiring lubrication, and is determined through actual experimentation. Here, it is 50 km/h. If the vehicle speed V is equal to or less than the set value $V_0$, step 1102 is repeated, while if the sensed value V is larger than the set value $V_0$, the TMCU 9 advances to step 1103, in which the control to shift the split gear assembly 17 into neutral is permitted. By this control process, the counter shaft and the oil pump are rotated not only during the warm-up period when the vehicle speed V is zero, but also until the vehicle speed exceeds the set value $V_0$, and therefore sufficient lubrication is insured inside the transmission 3 when the engine is started.

Figure 12:
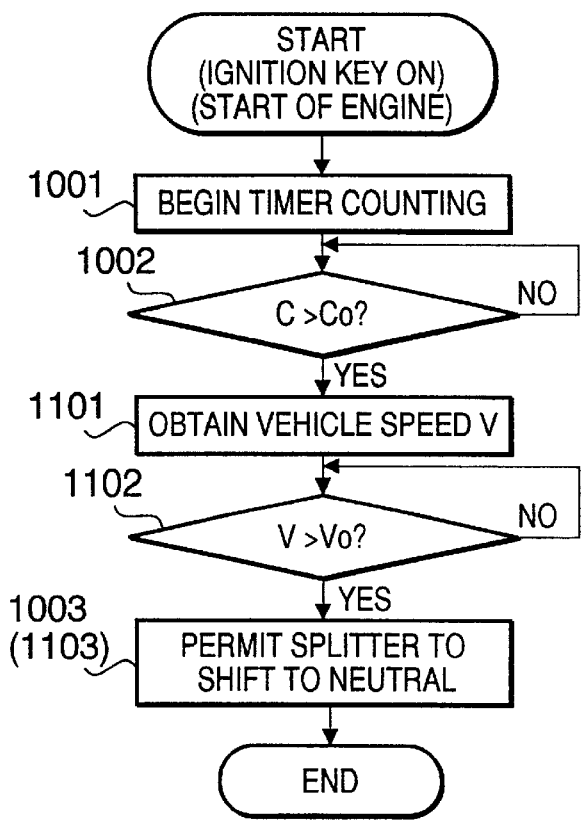
FIG. 12 illustrates another alternative for maintaining the splitter neutral shift prohibition control.

FIG. 12 shows another alternative of the splitter N-prohibition maintenance control process. In this example, the splitter is prohibited from being shifted into neutral until a prescribed time has elapsed and the vehicle speed exceeds a prescribed value after the engine is started. This control process combines the control processes shown in FIGS. 10 and 11, or links the two control processes with an AND condition. Specifically, the control process is carried out in following order: steps 1001, 1002, 1101, 1102 and 1003 (1103). By this control process, the counter shaft and the oil pump are rotated for at least the period $C_0$ and until the vehicle speed exceeds the set value $V_0$, and therefore sufficient lubrication is provided inside the transmission when the engine is started. It should be noted that these steps may be changed appropriately to create another variation.

Through the control processes described above, lubrication may be reliably attained when the engine is started, such as during the warm-up period, and failures due to lack of lubrication may be prevented from occurring, even in a range gear assembly having a construction that is not conducive to good lubrication.

It should be noted that the present invention is not limited to the embodiments described above. For example, the present invention can be applied in a transmission which does not have a range gear assembly, because the present invention still insures sufficient lubrication to the split gear assembly and the main gear assembly when the engine is started. The clutch may be a fully automatic clutch without a manual clutch function or a normal manual clutch.

The described and illustrated arrangement is disclosed in Japanese Patent Application No. 11-361530 filed Dec. 20, 1999 and the instant application claims priority of this Japanese Patent Application, the entire disclosure of which is incorporated herein by reference.

What is claimed is:

1. A multiple-gear vehicle transmission comprising:
   a main gear assembly;
   a splitter that operates as an auxiliary transmission and is provided between an engine and the main gear assembly such that an engine drive power is transmitted via the splitter and main gear assembly, the splitter having a high gear position, a low gear position and a neutral position; and a splitter controller for intermittently shifting the splitter between the neutral position and a position other than neutral position, the splitter controller prohibiting the splitter from being shifted to the neutral position when the engine is starting up.

2. The multiple-gear vehicle transmission according to claim 1, wherein the splitter controller prohibits the splitter from being shifted to the neutral position until a prescribed period of time has elapsed after the engine is started.

3. The multiple-gear vehicle transmission according to claim 1, wherein the splitter controller prohibits the splitter from being shifted to the neutral position until a vehicle speed has exceeded a prescribed value after the engine is started.

4. The multiple-gear vehicle transmission according to claim 1, wherein the splitter controller prohibits the splitter from being shifted to the neutral position until both a prescribed period of time has elapsed and a vehicle speed has exceeded a prescribed value after the engine is started.

5. The multiple-gear vehicle transmission according to claim 1 further including a range gear that operates as an auxiliary transmission on an output side of the transmission.

6. The multiple-gear vehicle transmission according to claim 2 further including a range gear that operates as an auxiliary transmission on an output side of the transmission.

7. The multiple-gear vehicle transmission according to claim 3 further including a range gear that operates as an auxiliary transmission on an output side of the transmission.

8. The multiple-gear vehicle transmission according to claim 4 further including a range gear that operates as an auxiliary transmission on an output side of the transmission.

9. The multiple-gear vehicle transmission according to claim 2, wherein the prescribed period of time is ten minutes.

10. The multiple-gear vehicle transmission according to claim 3, wherein the prescribed value is 50 km/h.

11. The multiple-gear vehicle transmission according to claim 4, wherein the prescribed period of time is ten minutes and the prescribed value is 50 km/h.

12. The multiple-gear vehicle transmission according to claim 1, wherein the position other than neutral position is the high gear position.

13. The multiple-gear vehicle transmission according to claim 1, wherein the splitter controller maintains the splitter in the neutral position for an interval determined in accordance with an oil temperature oil when it intermittently shifts the splitter between the neutral position and the position other than neutral position.

14. The multiple-gear vehicle transmission according to claim 1, wherein the splitter controller maintains the splitter in the position other than neutral position for a period determined in accordance with an oil temperature.

* * * * *